(12) United States Patent
O'Leary

(10) Patent No.: US 6,912,816 B2
(45) Date of Patent: Jul. 5, 2005

(54) STRUCTURALLY INTEGRATED SOLAR COLLECTOR

(75) Inventor: Patrick O'Leary, Jacksonville, FL (US)

(73) Assignee: Futura Solar, LLC, North Jacksonville, FL (US)

( * ) Notice: Subject to any disclaimer, the term of this patent is extended or adjusted under 35 U.S.C. 154(b) by 126 days.

(21) Appl. No.: 10/261,246

(22) Filed: Sep. 30, 2002

(65) Prior Publication Data

US 2003/0061773 A1 Apr. 3, 2003

Related U.S. Application Data

(60) Provisional application No. 60/326,297, filed on Oct. 1, 2001.

(51) Int. Cl.$^7$ .................................................. F24J 2/04
(52) U.S. Cl. ...................... 52/173.3; 126/621; 126/623; 126/633; 136/206; 136/251
(58) Field of Search ........................ 52/173.3; 126/621, 126/623, 629, 633, 906; 136/206, 251; 165/482; 323/906

(56) References Cited

U.S. PATENT DOCUMENTS

| | | | | |
|---|---|---|---|---|
| 3,412,728 A | * | 11/1968 | Thomason | .................. 126/620 |
| 3,919,998 A | * | 11/1975 | Parker | ......................... 126/634 |
| 4,020,827 A | * | 5/1977 | Broberg | ...................... 126/696 |
| 4,068,652 A | * | 1/1978 | Worthington | ............... 126/603 |
| 4,103,825 A | | 8/1978 | Zornig | |
| 4,108,155 A | * | 8/1978 | Koizumi et al. | ............. 126/621 |
| 4,162,671 A | * | 7/1979 | Christy | ....................... 126/400 |
| 4,169,459 A | * | 10/1979 | Ehrlich | ........................ 126/647 |
| 4,201,188 A | | 5/1980 | Cummings | |
| 4,237,865 A | * | 12/1980 | Lorenz | ........................ 126/599 |
| 4,237,869 A | | 12/1980 | Rooney | |
| 4,280,479 A | * | 7/1981 | Sykes, Jr. | ................... 126/624 |
| 4,300,532 A | * | 11/1981 | Olsen | .......................... 126/708 |
| 4,301,787 A | * | 11/1981 | Rice | ............................ 126/702 |
| 4,324,289 A | * | 4/1982 | Lahti | .......................... 165/48.2 |
| 4,416,255 A | * | 11/1983 | Secamiglio et al. | ........ 126/631 |
| 4,449,347 A | | 5/1984 | Rooney | |
| 4,466,424 A | | 8/1984 | Lockwood, Jr. | |
| 4,494,528 A | * | 1/1985 | Horton | ....................... 126/627 |
| 4,674,244 A | | 6/1987 | Francovitch | |
| 4,899,728 A | | 2/1990 | Peter et al. | |
| 4,934,338 A | | 6/1990 | Hollick et al. | |
| 5,092,939 A | | 3/1992 | Nath et al. | |
| 5,452,710 A | | 9/1995 | Palmer | |
| 5,589,006 A | * | 12/1996 | Itoyama et al. | ............. 136/248 |
| 5,768,831 A | | 6/1998 | Melchior | |
| 6,201,179 B1 | | 3/2001 | Dalacu | |

FOREIGN PATENT DOCUMENTS

| | | | | |
|---|---|---|---|---|
| CA | 1196825 | | 11/1985 | |
| FR | 2 621 943 | | 10/1987 | |
| JP | 59/74458 | * | 4/1984 | .............. F24J/3/02 |
| WO | 03/048655 A1 | * | 6/2003 | .............. F24J/2/28 |

* cited by examiner

*Primary Examiner*—Robert Canfield
(74) *Attorney, Agent, or Firm*—Roberts Abokhair & Mardula

(57) ABSTRACT

A structurally integrated solar collector. Roof and wall covering components are integrated with solar collectors to permit solar energy to be converted to heat, electricity and hot water for use within a building. A roof truss is described that additionally captures sunlight for illuminating a building. The roof and wall components are adaptable to heating and cooling seasons so as to minimize the loss of air-conditioned air in the summer time and to maximize solar heating during cold months. Solar energy captured by a structurally integrated solar collector can be directly converted to electricity through use of photovoltaic materials or by harnessing airflow through structurally integrated solar collector to obtain electricity through mechanical conversion.

19 Claims, 12 Drawing Sheets

STRUCTURALLY INTEGRATED SOLAR COLLECTOR

CROSS REFERENCE TO RELATED APPLICATIONS

This application claims priority under 35 U.S.C. §119(e) from provisional application No. 60/326,297 filed Oct. 1, 2001. The No. 60/326,297 provisional application is incorporated by reference herein, in its entirety, for all purposes.

FIELD OF THE INVENTION

The present invention relates to building construction and the placement of solar energy collectors thereon. More specifically, the present invention relates to integrating solar collectors with building components so as to permit the simultaneous solar harvesting of heat and light, the conversion thereof to electrical energy, and the selective use of heat for heating and cooling.

BACKGROUND OF THE INVENTION

Traditional roof technologies construct elevated covers to buildings. A roof typically comprises a layer of impermeable tar, tarpaper or concrete laid over a wood or metal platform (deck) of corrugated metal sheeting. While a roof seals a building from the environment, it also results in substantially reduced daylight illumination, the loss of a heat source in cool seasons and the collection of heat in warm seasons. Skylights may or may not be fitted to improve illumination but may add to the heat gain in the warmer months. Similarly, wall construction is primarily a means of sealing out the elements from the inside of a structure.

Solar energy is tantalizing in both its promise and its evasiveness. The ultimate objective is to utilize solar energy to heat, cool, provide electricity, and light structures efficiently and to reduce the need for energy from other sources. Various approaches have been suggested for achieving each of elements of this objective.

In a "German Roof" a series of windows are present on the roof of a building. In cross section these appear as a saw tooth pattern on the roof. They provide both light and heat (but usually only when they face the sun).

Referring to FIG. 1, the "Minnesota window heater" is illustrated. This unit is placed in a window 27. The suns rays are absorbed on a black (or dark)) panel 25 heating the air in the vicinity of the panel. The air rises through the heater (as noted by the arrows, causing more cool air to be drawn into the heater through opening 24. Heated air is expelled through opening 26 into the room.

Technologies that collect some aspect of solar energy introduce some negative side effects that require energy consumption to offset. Solar heat exchangers for water and space heating or for electrical energy collection cause a build up of heat in summer months. This heat needs to be actively dissipated or mechanically cooled at an expense. Similarly, solar technologies that are designed to heat water and convert solar energy to electrical energy ignore winter heating needs. Skylights and solar daylighters provide illumination but just as often add heat (via direct sunlight) as fast as illumination and increase the "solar oven" effect of most buildings.

At additional expense and effort, solar photovoltaic panels may be laid horizontally or framed to sit at an angle. For example, photovoltaic (amorphous) on plastic substrate is available to lay in pans of standing seam metallic roofing. While photovoltaic panels permit the production of electricity, the per-kilowatt cost of generation is high. Additionally, the panels block solar illumination of the structure thereby trading off one form of solar energy for another.

"The SOLARWALL® Solar Heating System" made by Conserval Engineering (Conserval Engineering) heats air in the winter. A southern wall is metal clad (aluminum or steel) on its exterior. A cavity is formed between the building's southern wall and the metal cladding. A ventilation fan, positioned at the top of the cavity creates reduced pressure within the cavity. Outside air is drawn in through holes in the metal cladding due to air pressure differential. The dark colored cladding is heated by solar radiation. The external air that is drawn over the metal cladding is heated and captured by openings in the metal cladding and collected in the wall cavity. The warmed air from the wall cavity rises to a plenum at the top of the cavity and is ducted to a circulation fan. The warmed air is circulated throughout the building. Applications include using the metal cladding as roofing material and overlaying the metal cladding with photovoltaic panels to produce electricity.

The Conserval Engineering approach, described above, is also described in U.S. Pat. No. 4,899,728 to Peter et. al, entiled "Method and Apparatus for Preheating Ventilation Air for a Building", ('728) and U.S. Pat. No. 4,934,338 to Hollick et. al, entitle, "Method and Apparatus for Preheating Ventilation Air for a Building", ('338). The description for patents '338 and '728 are virtually the same (the '338 patent is a divisional of the '728 patent). Effectively, both citations are for an exterior wall passive solar heat collector for heating outside air.

In Canadian Patent 1,196,825 issued to Hollick and entitled "Method for Preheating Ventilation Air in a Building" ('825), describes an outer transparent glazing to a south wall that allows solar energy to penetrate the glazing material (glass, plastic or the like) and be absorbed on a black painted building wall. There is a space between the glazing material and the building wall forming an air chamber. Outside air is drawn into the air chamber through an opening at the bottom of the glazed material. The air is heated by the building wall which has become heated from absorbing solar energy. The air rises and is distributed by fan and duct work through the building for heating purposes. If heating is not desired, the hot air is allowed to vent to the outside.

In U.S. Pat. No. 4,449,347 issued to Rooney and entitled "Solar Collection Building Truss," ('347) describes a solar collector integrated into a building truss that can be fabricated at a building site or pre-fabricated at a factory. The '347 patent teaches use of reflective surfaces to direct light to a heat absorbing member connected to a heat exchanger or other means for storing heat generated by the heat absorbing member. A similar truss was described in U.S. Pat. No. 4,237,869 also issued to Rooney, entitled "Solar Collector."

U.S. Pat. No. 6,201,179 issued to Dalacu and entitled "Array Of Photovoltaic Modules For A Integrated Solar Power Collection System," describes a solar powered collection system comprising a variety of arrays for generating electricity.

U.S. Pat. No. 4,674,244 issued to Francovitch and entitled "Roof Construction Having Insulation Structure Membrane And Photovoltaic Cells," teaches a means for roof construction that integrates photovoltaic cells into the roof structure.

U.S. Pat. No. 5,092,939 issued to Nath et. al., and entitled "Photovoltaic Roof Method Of Making Same," describes a roof structure comprising panels in which a photovoltaic layers has been incorporated.

U.S. Pat. No. 5,452,710 issued to Palmer and entitled "Self Sufficient Apparatus And Method For Conveying Solar Heat Energy From An Attic," ('710) describes a solar energy absorbing roof that heats air in the attic below the roof. In '710, solar-generated heat is collected from the attic stored and/or distributed within the building. Fans and other electrical apparatus needed to capture, distribute, and store the collected heat are powered by photovoltaic cells placed on the roof.

U.S. Pat. No. 4,466,424 issued to Lockwood and entitled "Solar Collector System For Standing Seam Roofs," ('424) describes a solar collector system incorporated into a standing seam roof. The collector is formed by securing two transparent sheets to the standing seams of a roof panel to form two channels, one acting as a heat exchanger and the other an insulating chamber. Sun light impinges on the bottom of the roof panel and heats it. Air travels over the heated surface of the bottom of the roof panel and is heated and collected by ductwork located near the center ridge of the roof.

U.S. Pat. No. 4,103,825 issued to Zornig and entitled "Solar Heated And Cooled Dwelling," describes means for collecting heated attic air during the heating season and removing unwanted heated attic air during the cooling season.

U.S. Pat. No. 4,201,188 issued to Cummings and entitled "Solar Collector And Heat Trap," describes a solar collector and heat trap for the collection of heat in an attic area of the home for subsequent distribution throughout the home.

Finally, French Patent 2,621,943 was issued to Hernecq for a heat collection system in the attic of a home for distribution throughout the home.

While these inventions are useful for producing heat or photovoltaic energy, they do not represent an integral construction member that has the capability of not only collecting heat for use in heating inside air but also producing electrical energy from the heat air collected.

What would be useful is a means of integrated solar collection into construction that would make efficient use of sunlight for illumination and solar energy for generation of heat and electricity without unwanted structural heating, and that would intercept sunlight generated heat for capture and use during winter and diversion away during summer. It would also be useful if sunlight and solar generated heat could be used to generate electricity and hot water under all seasonal conditions during daytime periods of peak electrical power consumption.

SUMMARY OF THE INVENTION

An embodiment of the present invention is a roof component that integrates a solar collector into the structure of the roof itself. Another embodiment of the present invention is a wall component that integrates a solar collector is built into the structure of an exterior wall.

It is an object of the present invention to integrate solar collection capability into roof and wall building components.

It is an object of the present invention to minimize roof shading by indirect day lighting and to obviate daytime artificial lighting requirements.

It is another object of the present invention to minimize the direct solar heating of the enclosed structure.

It is a further object of the present invention to capture sunlight generated heat for diversion away from the enclosed structure during the summer, in order to minimize required cooling load and for use within the structure during winter in order to minimized the heating load.

It is yet another object of the present invention to use the captured sunlight generated heat to generate electricity and hot water for the structure year round.

It is still another object of the present invention to minimize electrical demand and reduce electrical lighting and mechanical space conditioning to 'stand-by-status.'

These and other objectives of the present invention will become apparent from a review of the general and detailed descriptions that follow. In one embodiment of the present invention, a combined solar collector is built into two sides of an integrated truss collector structure, in lieu of a built up platform of roof decking and tar, etc. This truss structure rests upon the load bearing walls, apex up, orienting panels to the south and panels the north. The southerly facing solar energy collection panels collect solar energy for conversion to heat and/or electricity. The northerly facing sunlight collection panels (daylighter panels) collect light for illumination of the interior of an enclosed structure.

In an alternate embodiment of the present invention, a solar collector is built into a roof panel that is used over a conventional roof deck. In another embodiment of the present invention, a solar collector is built into a wall panel that is used to cover an exterior wall, oriented vertically on the side of a building.

DETAILED DESCRIPTION OF THE INVENTION

Figure 2:
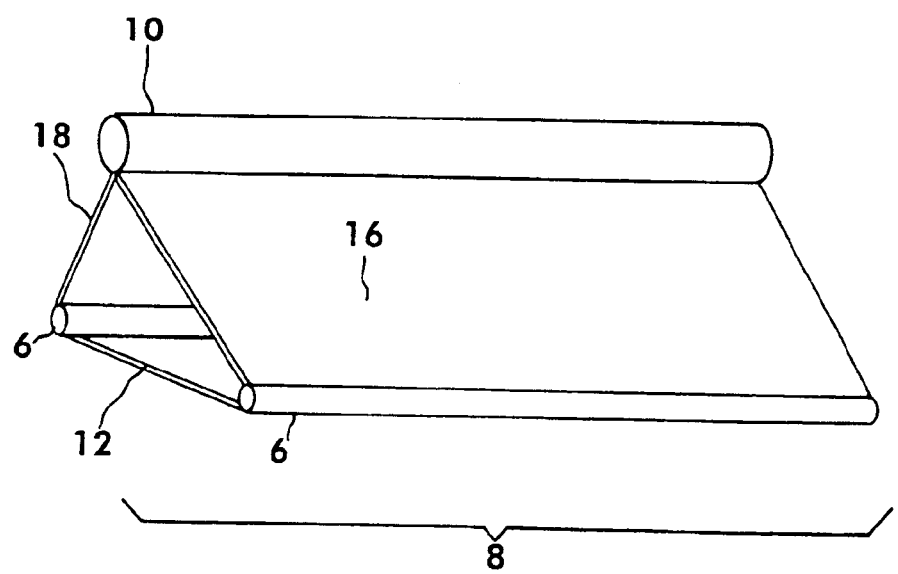
FIG. 2 illustrates the integrated truss according to embodiment of the present invention.

An embodiment of the present invention is a roof structure that integrates solar collectors into the structure of the roof itself. Referring to FIG. 2 a cross section of an integrated truss collector 8 is illustrated. The integrated truss collector 8 illustrated comprises two lower rails 6, a cross member 12, a truss air duct 10, solar energy collection panel 16 and daylighter panel 18. In an embodiment of the present invention, the solar energy collection panel 16 is oriented in a southerly direction and the daylighter panels 18 are oriented in a northerly direction. Each end of the integrated truss collector 8 is supported by a weight-bearing structure.

As illustrated In FIG. 2, the integrated truss collector 8 comprises a single panel length, however this is not meant as a limitation. As would be apparent to those skilled in the art of the present invention, the number of panels may be determined by the producer of the integrated truss collector 8, subject to limitations of structural strength and loading. Additionally, integrated truss collector 8 may comprise supporting structures in addition to the lower rails 6 and, cross member 12, which supporting structures would be apparent to those skilled in the art of the present invention. Additionally, truss air duct 10, which as will be described in detail below receives heated air from solar energy collection panel 16, is illustrated as tubular in cross section. However, this is not intended as a limitation. Other means of receiving heated air from solar energy collection panel 16 may be used without departing from the scope of the present invention. For example, in an embodiment of the present invention, the truss air duct 10 is integrated with the solar energy collection panel 16.

Figure 1:
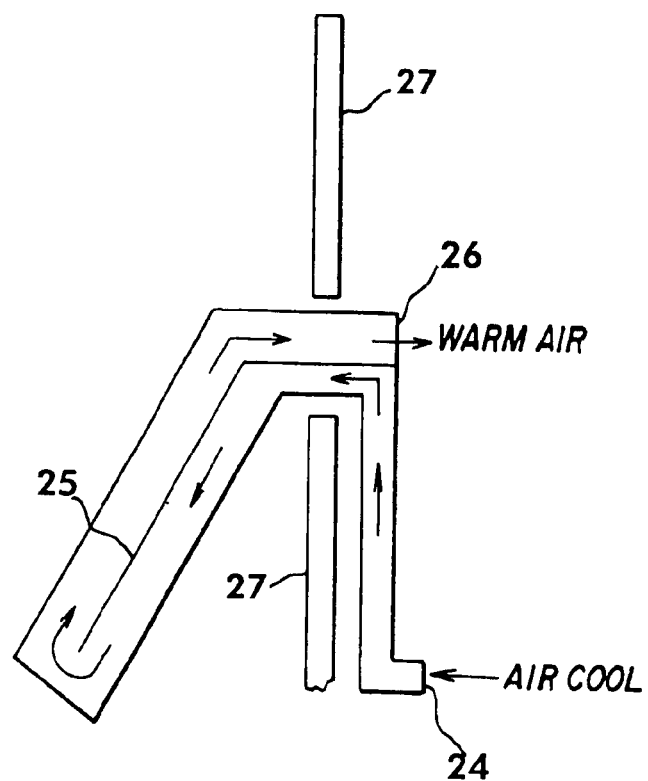
FIG. 1 illustrates a "Minnesota Window Heater" as known in the art.
Figure 3:
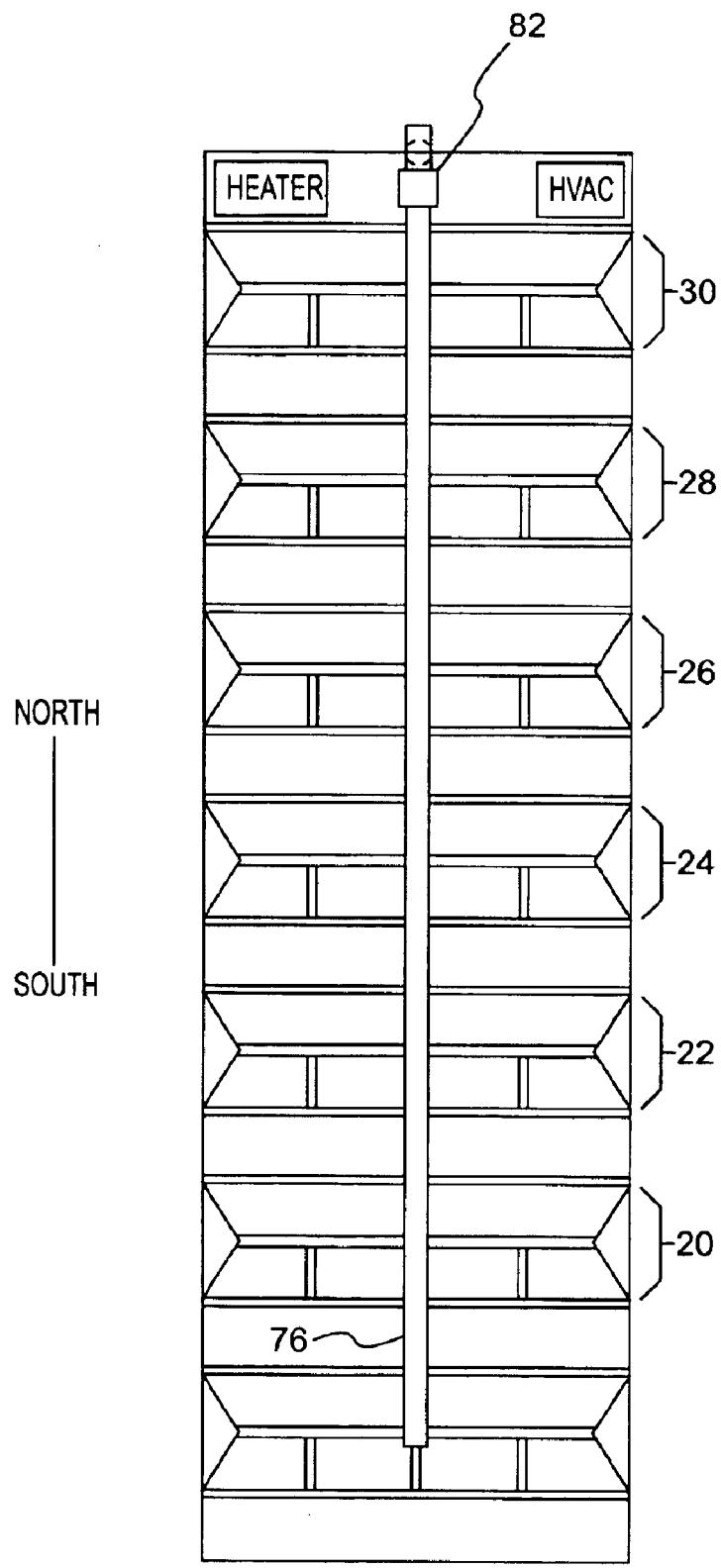
FIG. 3 illustrates a top view of the present invention having a series of collectors according to embodiments of the present invention.

Referring now to FIG. 3, a plurality of integrated truss collectors assembled on a building is illustrated. The integrated truss collectors 20, 22, 24, 26, 28, 30 are generally oriented east-west with the sloped portions facing south for collecting solar energy and north for collecting light for illumination. A roof air duct 76 for collecting and distributing warm air runs in a north-south direction above the trusses 20, 22, 24, 26, 28, 30. The roof air duct 76 connects to each of the roof trusses at the truss air duct 10 (illustrated in FIG. 1). This roof air duct 76 may be steel, aluminum or other suitable material, including entirely or partially transparent material to allow further air heating. The roof air duct 76 may extend all the way to the south side of the roof, if a "South Wall" (described below) is fitted to the south face of the structure.

Figure 4:
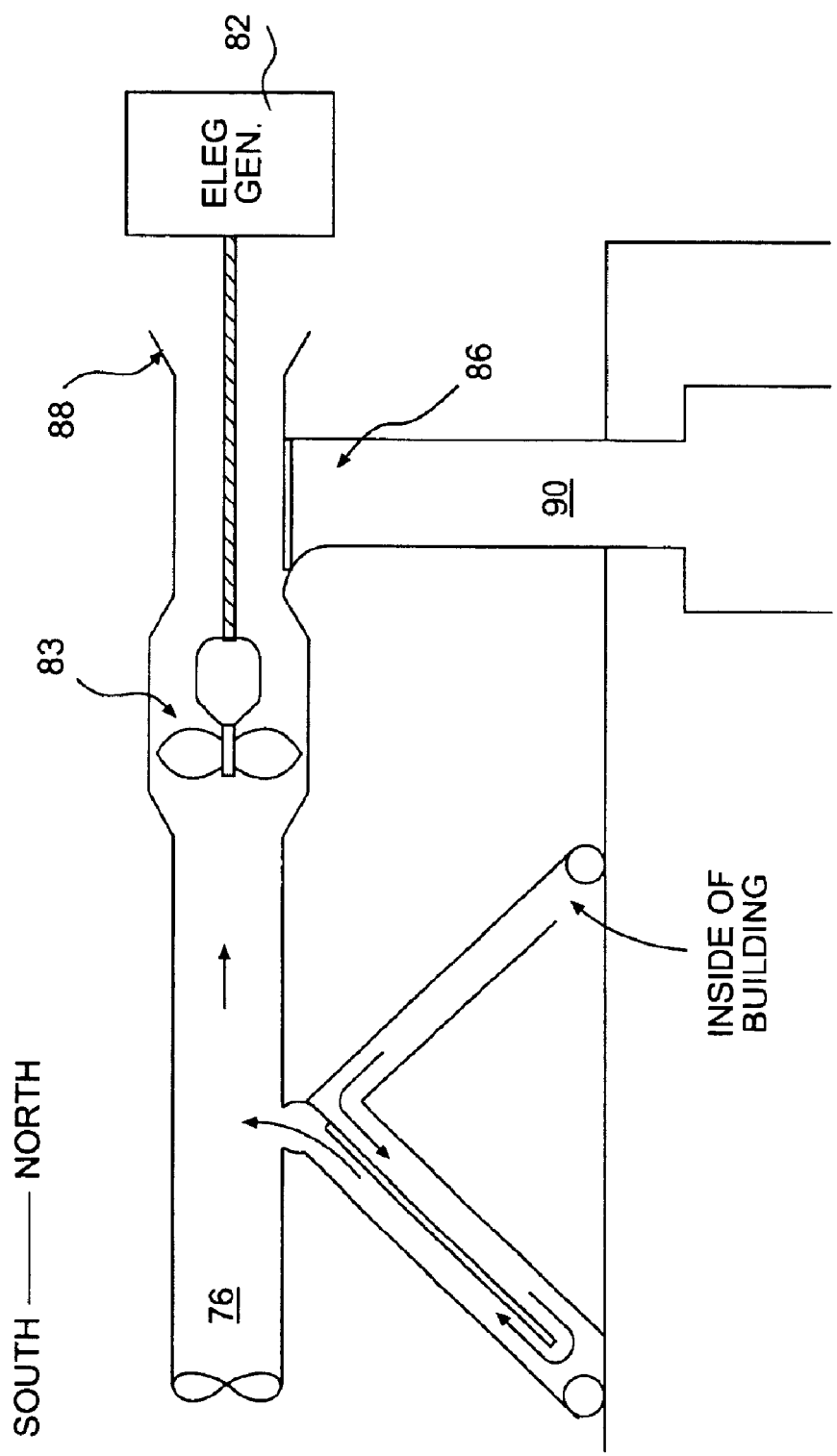
FIG. 4 illustrates a side view of the present invention further illustrating airflow, turbine and electrical production elements according to embodiments of the present invention.

Referring to FIG. 4, warm air collected from each of the integrated truss collectors is used in an electrical generator 82 to generate electricity for building use or/and distribution to an electrical grid. The electrical generator 82 is driven by a low-pressure turbine 83 that is turned by the warm air flowing through the roof air duct 76. A louver 86 (illustrated in the closed position) or similar device directs the hot air exhaust to chimney 88 for venting into the atmosphere.

Figure 5:
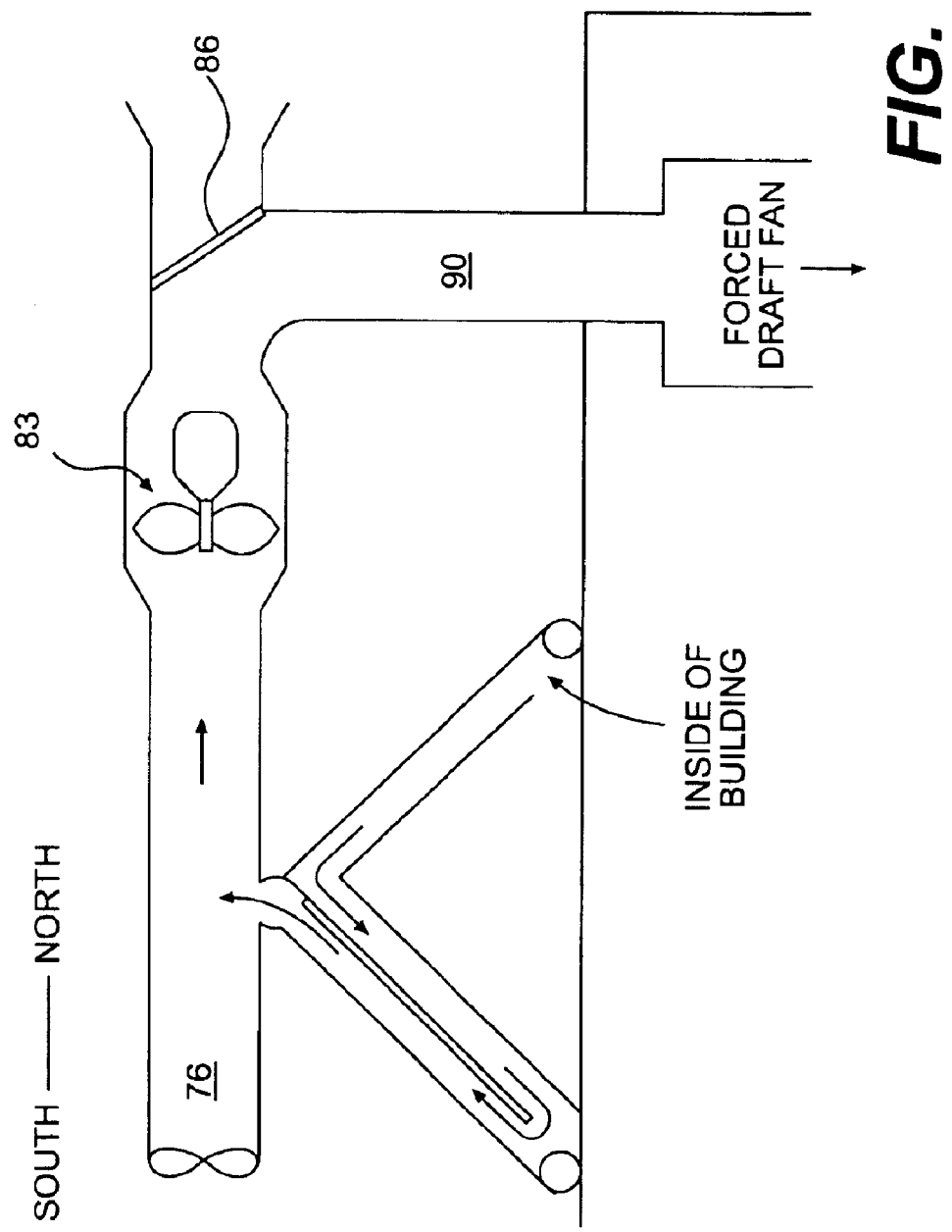
FIG. 5 illustrates a side view of the present invention wherein heated air is recirculated back into the building according to embodiments of the present invention.

Referring now to FIG. 5, warm collected from each of the integrated truss collectors and flowing through the roof air duct 76 is used for heating the internal structure. In this embodiment, louver 86 is open to direct warm air into the internal structure through vent 90. Low-pressure turbine 83 is not configured to produce electricity in this embodiment.

Figure 6:
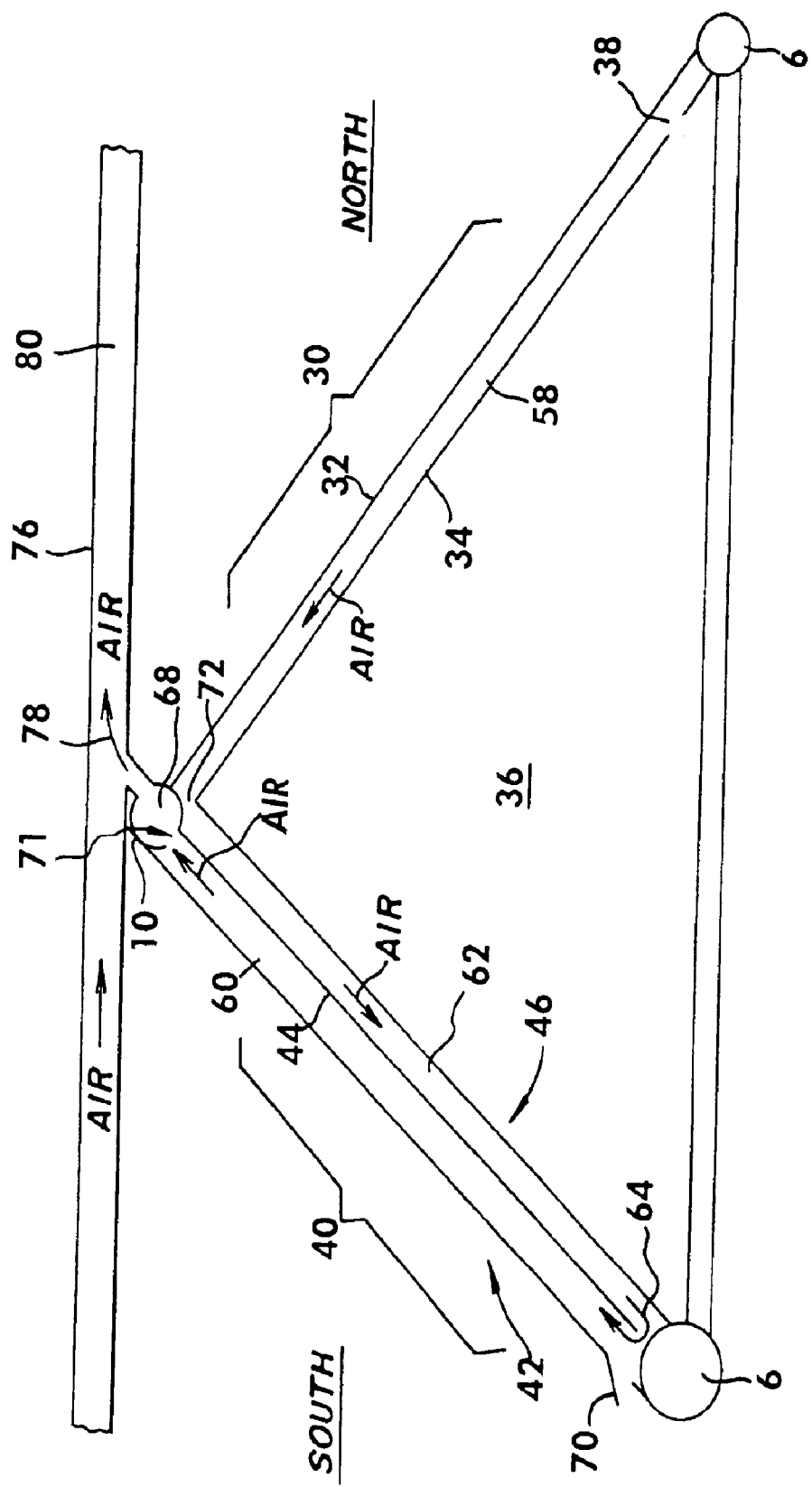
FIG. 6 illustrates a side view of the present invention showing airflow and heat collection means according to embodiments of the present invention.
Figure 7:
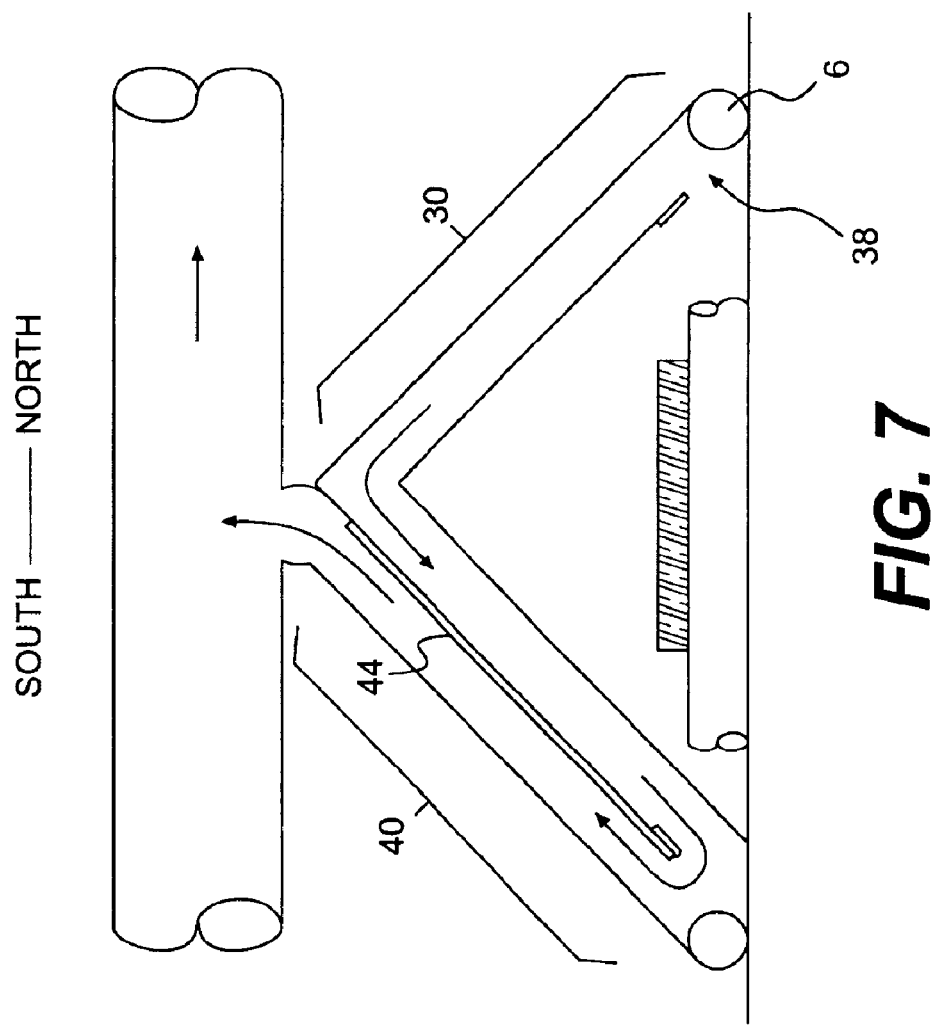
FIG. 7 illustrates a side view of the present invention having photovoltaic cells on one surface of the collector according to embodiments of the present invention.

Referring to FIGS. 6 and 7, the airflow of an embodiment of the present invention is further illustrated. Oriented in the northerly direction is daylighter panel 30. Oriented in the southerly direction is solar energy collection panel 40. (In the southern hemisphere, the north-south designations are reversed.)

The daylighter panel 30 comprises outer glazing 32 and inner glazing 34, however this is not meant as a limitation. Additional glazing may be used without departing from the scope of the present invention. Outer glazing 32 and inner glazing 34 form channel 58 that directs air from the daylighter panel 30 to solar energy collection panel 40. The daylighter panel 30 allows daylight to enter the structure to illuminate the spaces within. The daylighter panel 30 is vented to draw inside air 36 from air intake vent 38 (located in proximity to bottom rail 6) and to vent the air to solar energy collection panel 40 via the air gap 72 located below and external to the truss air duct 10. In another embodiment, where the daylighter panel is triple glazed, air intake vent 38 would be located near the apex of the triangular cross-section of the integrated truss collector. In this embodiment, a second channel would be formed in daylighter panel 30 (not illustrated) and the air would flow down this second channel to channel 58 before flowing to the solar energy collection panel 40 as previously described.

Solar energy collection panel 40 comprises a single transparent layer 42 comprising glass, plastic or other transparent material that allows the sun to illuminate a light-absorbing layer 44. In an embodiment according to the present invention illustrated in FIG. 7, a daylighter panel 30 and a solar energy collection panel 40 are deployed as described in reference to FIG. 6 with the exception that light-absorbing layer 44 is a photovoltaic (PV) material that absorbs solar energy to produce electricity. Solar energy not converted to electricity is converted to heat that is collected as described below.

In another embodiment, light-absorbing layer 44 is a rigid material that is optimized for heat absorption. By way of illustration not as a limitation, light-absorbing layer 44 is a metal or wood sheet that is painted black. A bottom layer 46 is solid, with an optionally silvered interior to enhance the reflectance characteristics from daylighter panel 30.

Referring again to FIG. 6, the three layers of solar energy collection panel 40 form two channels, channels 60 and 62. In operation, sunlight passes through the transparent panel 42 of the solar energy collection panel 40 and is absorbed by light-absorbing layer 44. As the air within channel 60 is heated1 it expands, rises and induces a movement toward the top of the truss. This in turn causes air to move through channel 62 downward through opening (also referred to as a "connection path") 64 in the light-absorbing layer 44 into channel 60 to be heated by the absorption panel. Air is drawn to the solar energy collection panel 40 from the daylighter panel 30 on the north-facing surface. Relatively cool inside air 36 is drawn into channel 58 though air intake vent 38. Air that is drawn into the system of the present invention travels through channel 58, which is connected to channel 62 at air gap 72. Thus a low pressure region, formed by the heated air of the solar energy collection panel 40, causes air to be transported from channel 58 in daylighter panel 30 through air gap 72 into channel 62, in solar energy collection panel 40. The air then passes through opening 64 at the bottom of the south facing solar energy collection panel 40 into channel 60 where it is heated. The heated air passes through air gap 71 connecting channel 60 to truss air duct 10. Heated air is then collected from a plurality of integrated truss collectors 8 (not illustrated) by roof air duct 76 through collection vents 78 in each of the plurality of truss air ducts 10. Heated air travels through the roof air duct 76 through channel 80.

When heating of the interior structure is desired, inside air 36 is drawn into the previously described channels, heated and distributed for return to the internal structure. During the middle of the day, warm air is from the roof through bypass 70 located on the solar energy collection panel 40 near lower rail 6. This avoids removing all the cool air from inside the building during hot weather.

The intake capture of external heated air is dictated by bypass 70. In one embodiment of the present invention, bypass 70 is opened or closed by the use of a bimetal hinge. The two metals of the hinge have differing expansion and contraction coefficients. It is the greater heat of summer time that opens the bypass. This is not meant as a limitation however. For example, bypass 70 may be mechanically or electrically actuated by a thermostat or other heat In another embodiment of the present invention, the heated air from the roof air duct 76 is directed to a heat exchanger where the heated air is used for hot water production. In yet another embodiment of the present invention, the heated air is used to operate a low-pressure turbine that in turn drives an electrical generator to produce electricity.

As noted previously, in one embodiment (see FIG. 7) of the present invention, light-absorbing layer 44 comprises a PV panel. Electricity from the PV panel and from the electrical generator (see FIG. 4), feed into the structure's electrical system for dedicated internal load, with heavy amperage leads inside the structure dedicated to the external utility grid.

Figure 8:
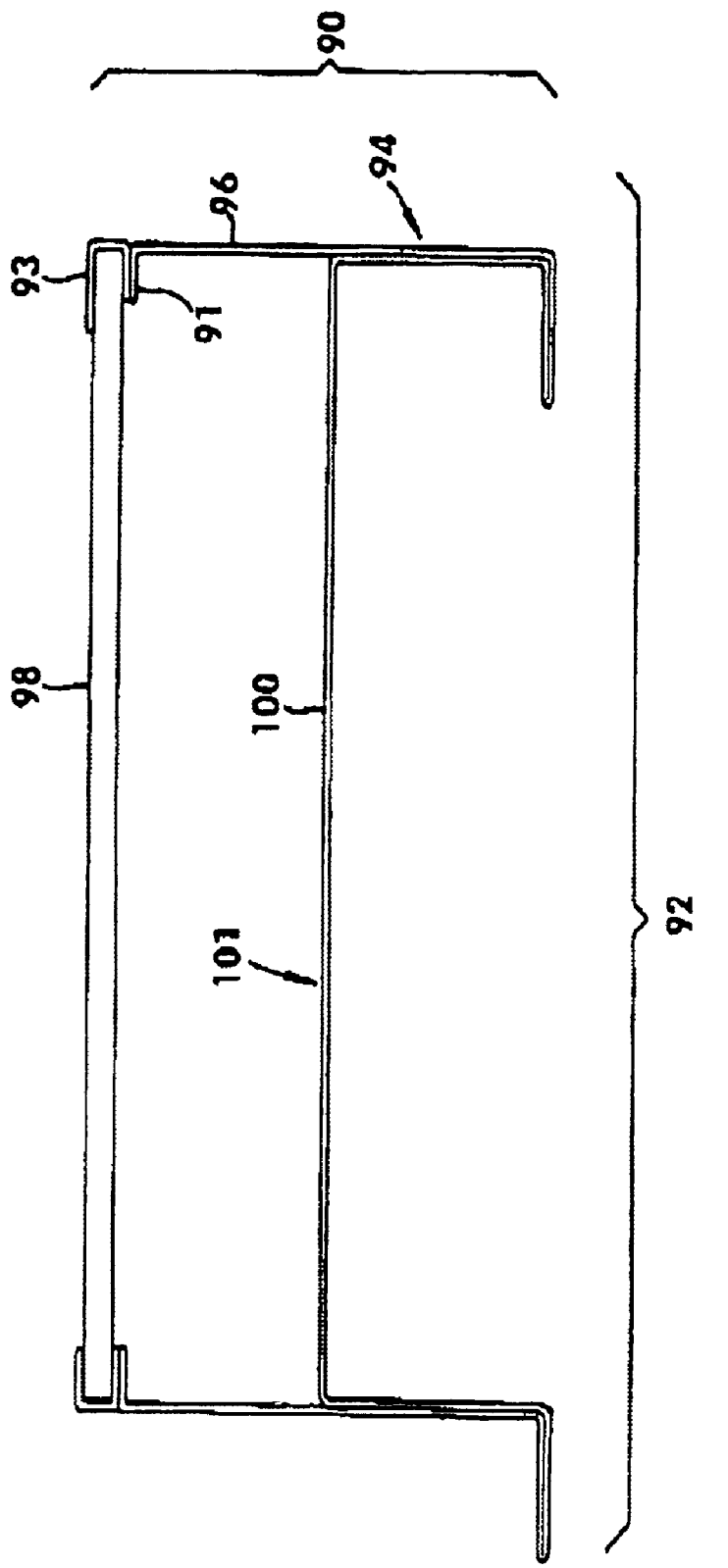
FIG. 8 illustrates the flat roof collector according to embodiments of the present invention.

Referring to FIG. 8, another embodiment of the present invention is illustrated. In this embodiment, an integrated flat roof collector 92 comprises a panel having two vertical side components 90 connected near the midpoints of each side component by a horizontal component 100. The vertical side components 90 are divided by the horizontal component into an upper segment 96 and a lower segment 94. In another embodiment, a bottom component (not shown) connects the bottom of each side component to form a base. A single transparent layer 98 covers the top of the tray and is supported by lower horizontal supports 91 and upper horizontal supports 93 that extend from the upper segments 96 of the vertical side components 90 of the panels. In an embodiment of the present invention, a light-absorbing layer 101 is attached to, or formed on, horizontal component 100.

Figure 9A:
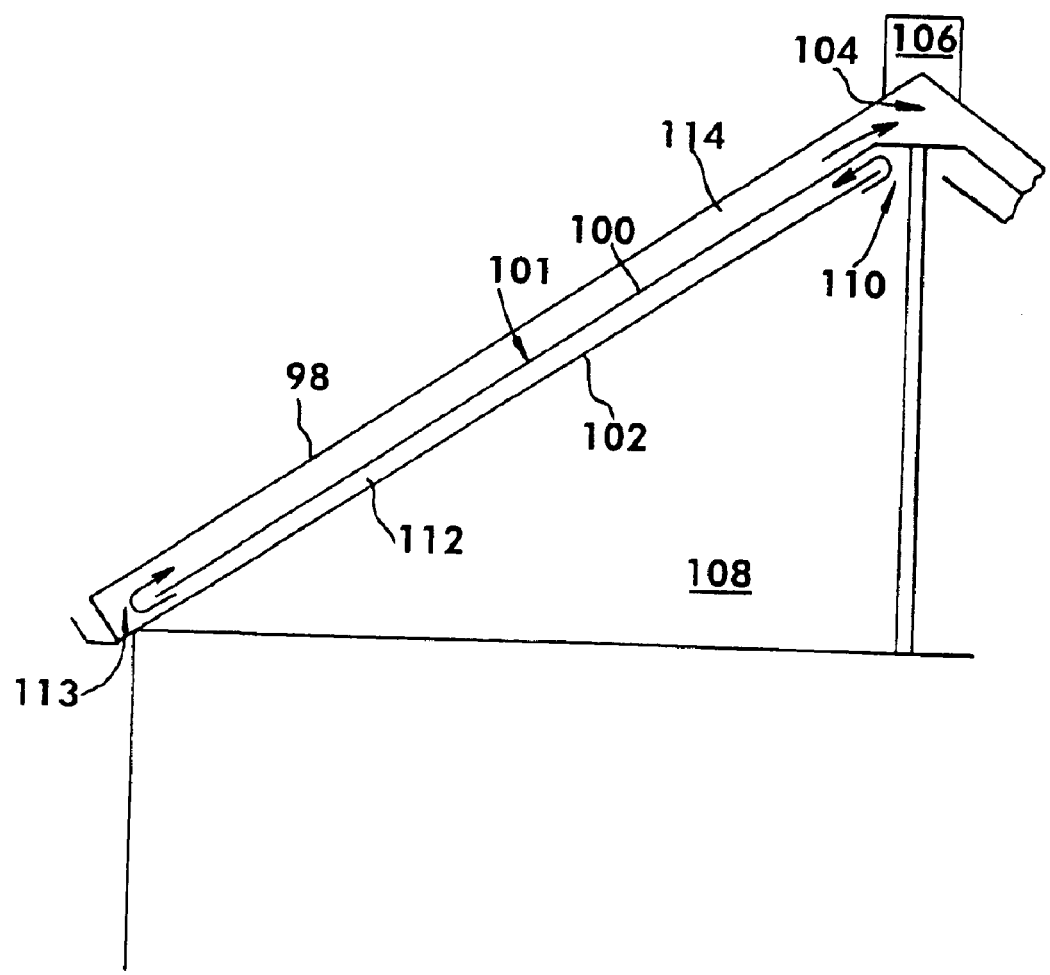
FIG. 9A illustrates the flat roof collector and associated flow of heated air according to embodiments of the present invention.

Referring to FIG. 9A, horizontal light-absorbing layer 101 is attached to or formed on horizontal component 100. The panels are installed on roof decking 102, preferably facing south, side-by-side, forming parallel rectangular trays that extend for the full pitch of the roof. The vertical side components 90 (see FIG. 8) are supported by roof decking 102 and form a first channel 112 bounded by the roof decking 102 (or, if implemented, the bottom component), the bottom of horizontal component 100 and the inside surfaces of the lower segments 94 of the vertical side components 90 (see FIG. 8). A single transparent layer 98 covers the top of the tray and is supported by the upper segments 96 of the vertical side components 90 of the panels (see FIG. 8). A second channel 114 is formed by the inside surfaces of the upper segments 96, the top of the light-absorbing layer 101, and the bottom of the transparent layer 98.

Transparent layer 98 comprises glass, plastic or other suitable transparent material that permits the passage of the sun's rays. Light-absorbing layer 101 and (which is not transparent) is supported by or formed on the horizontal component 100 and comprises photovoltaic (PV) material or a light absorbing material. In one embodiment, the light absorbing material 101 is a layer of dark paint applied to horizontal component 100.

In this configuration, air is drawn in from the attic space 108 through opening 110. Air rising on the upper side of the panel through second channel 114 draws air from the attic space 108 through first channel 112, through junction 113 connecting first channel 112 and second channel 114, and into second channel 114 The heated air from second channel 114 rises and passes into a roof cap collector 104. At this point, the heated air is available for use.

Figure 9B:
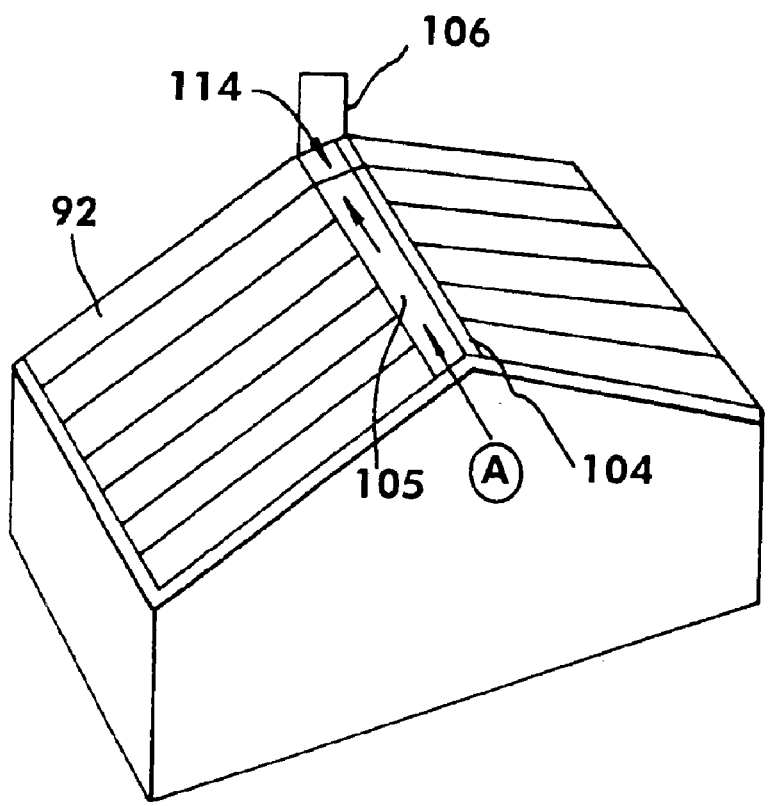
FIG. 9B illustrates a plurality of flat roof collectors configured as roofing system according to embodiments of the present invention.

In an embodiment of the present invention, a plurality of integrated flat roof collectors 92 comprises a roofing system. Referring to FIG. 9B, the roof cap collector 104 connects the plurality of integrated flat roof collectors to form an collection channel 105 to receive the air heated by each of the plurality of integrated flat roof collectors. In one embodiment, the heat air drives a low-pressure turbine that in turn drives an electrical generator. In another embodiment, the heated air is passed through a heat exchanger to heat water. In yet another embodiment, the heated air is returned through ductwork to heat the inside of a building. The airflow path is completed by chimney 106 that allows the air to vent to the outside. In another embodiment, the airflow path is completed through a vent in roof cap collector 104.

Figure 10A:
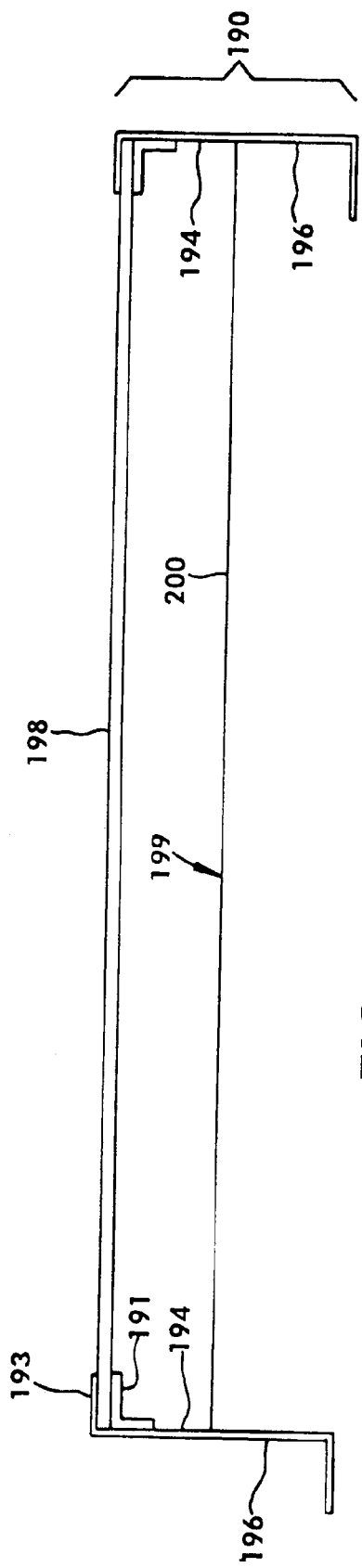
FIG. 10A illustrates a side view of a flat roof collector according to embodiments of the present invention.
Figure 10B:
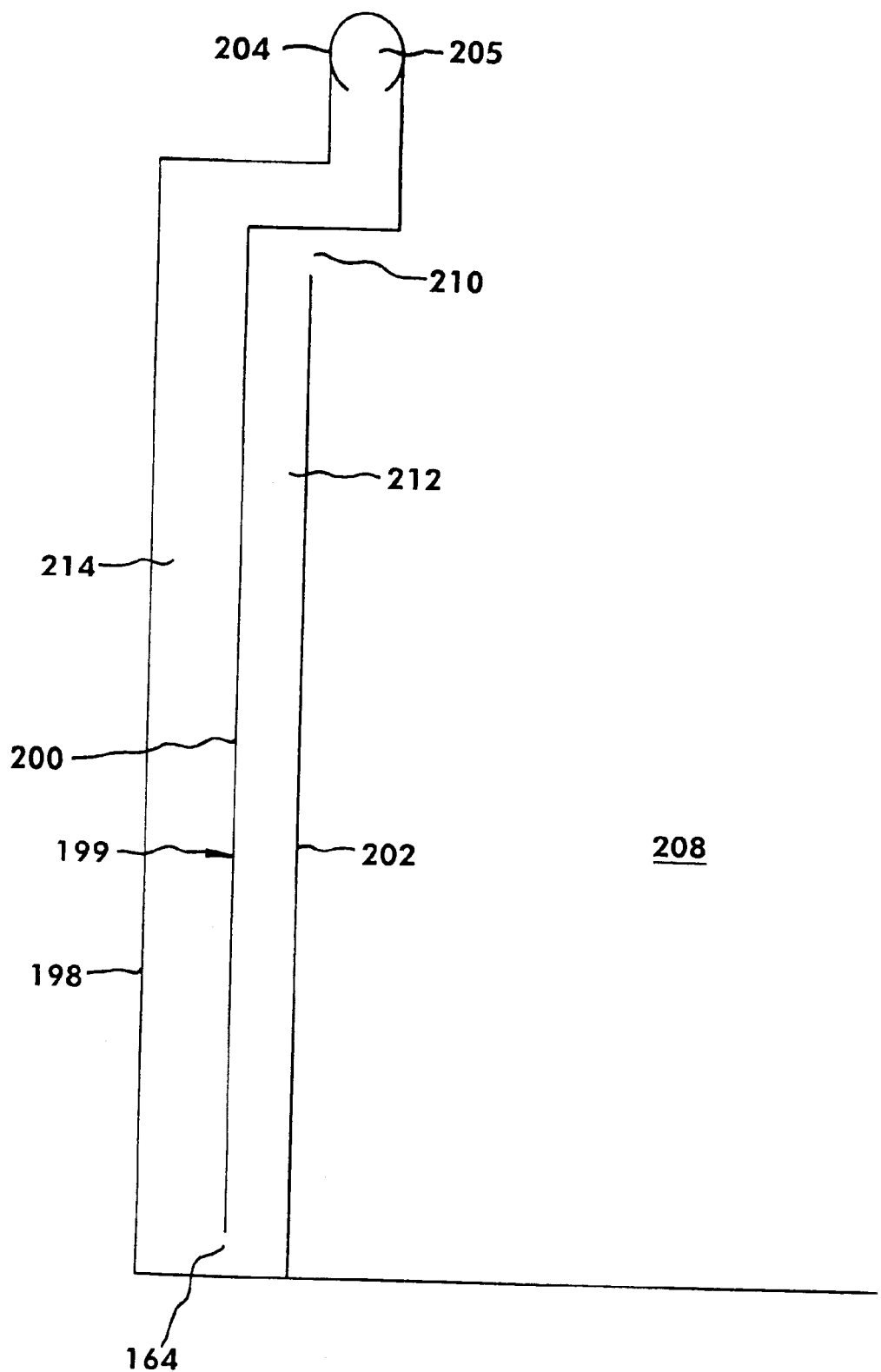
FIG. 10B illustrates a wall collector and associated flow of heated air according to embodiments of the present invention.

In an alternate embodiment, flat panels are used to create an integrated wall collector (or "south wall" collector) as illustrated in FIGS. 10A and 10B. The integrated wall collector may be used as a standalone collection system or in conjunction with an integrated truss collector or an integrated flat roof collector as previously described.

Referring to FIGS. 10A and 10B, another embodiment of the present invention is illustrated. In this embodiment, a solar collector comprises a panel having two vertical side components 190 connected near the midpoints of each side component by a horizontal component 200. Each vertical side component 190 is divided by the horizontal component into an upper segment 194 and a lower segment 196. In another embodiment, a bottom component (not shown) connects the bottom of each side component to form a base. A horizontal light-absorbing layer 199 is attached to or formed on horizontal component 200.

Referring also to FIG. 10B, panels are installed on an exterior wall of a building, preferably a southerly facing wall, side-by-side forming parallel rectangular trays that extend for the full height of the wall. The lower segments 196 are supported by exterior wall 202 (FIG. 10B) and form a first channel 212 bounded by the exterior wall 202, the bottom horizontal component 196 and the inside surfaces of the lower segments 194 (FIG. 10A). A transparent layer 198 covers the top of the tray and is supported by lower horizontal supports 191 and upper horizontal supports 193 that extend from the upper segments 192 of the panels. A second channel 214 is formed by the inside surfaces of the upper segments 192, the top of horizontal component 200, and the bottom of the transparent layer 198.

It should be noted that production of the various walls can occur in a number of ways. For example the vertical components and horizontal component can be of a single piece of metal that is formed with the various angles required. However, where manufacturing concerns dictate, especially where a coating is to be applied to the metal components, the vertical components and the horizontal component can be constructed of a number of separate pieces that are assembled to achieve the angles and surfaces noted in FIG. 10A.

Referring again to FIG. 10A, transparent layer 198 comprises glass, plastic or other suitable transparent material that permits the passage of the suns rays. A light-absorbing layer 199 is supported by the horizontal component 200 and comprises photovoltaic (PV) material or a light absorbing material. In one embodiment, the light absorbing material is a layer of dark paint applied to horizontal component 200.

The operation of the integrated wall collector illustrated in FIG. 10A is illustrated in FIG. 10B. In an embodiment of the present invention, a plurality of integrated wall collectors comprises a wall system. The wall collector 204 of each of the plurality of integrated wall collectors is connected to a collection air duct to receive the air heated by each of the plurality of integrated wall collectors. In this configuration, air is drawn in from the interior space 208 through opening 210. Air rising on the upper side of the panel through second channel 214 draws air from the interior space 208 through first channel 212, through ajunction 164 connecting first channel 212 and second channel 214, and into second channel 214 The heated air from second channel 214 rises and passes into a wall collector 204. The wall collector 204 connects the plurality of integrated wall collectors to form a collection channel 205 to receive the air heated by each of the plurality of integrated wall collectors. At this point, the heated air is available for use. In one embodiment, the heat air drives a low-pressure turbine that in turn drives an electrical generator. In an embodiment of the present invention, the heated air is passed through a heat exchanger to heat water. In yet another embodiment of the present invention, the heated air is returned through ductwork to heat the inside of a building. If the integrated wall collector is used in conjunction with an integrated truss collector or a flat panel, the heated air received at wall collector 204 may be conveyed to the either roof air duct 76 (see FIG. 6 and related description) or roof cap collector 104 (see FIGS. 9A and B and related description).

Figure 11:
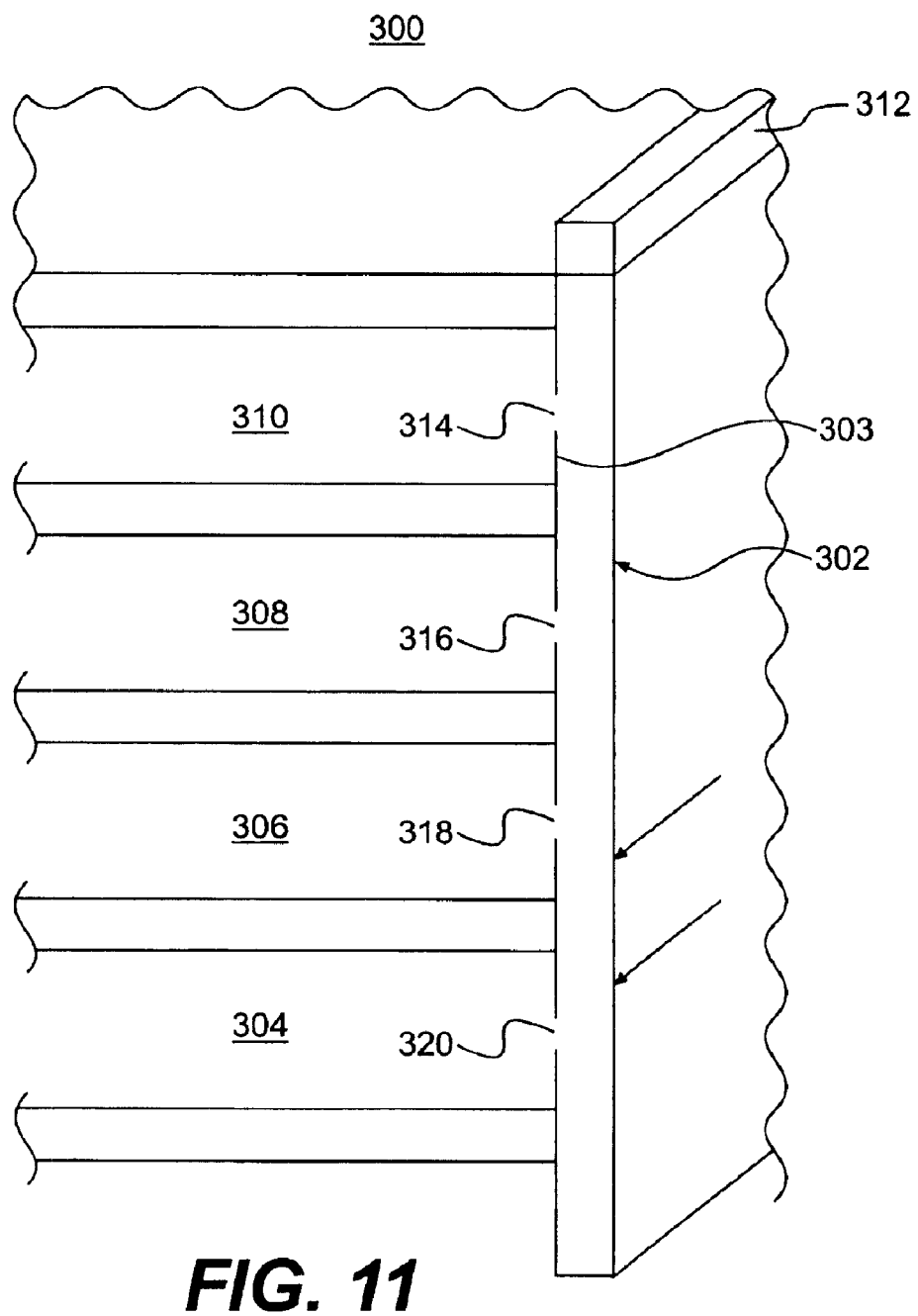
FIG. 11 illustrates a conceptual view of embodiments of the present invention when employed in a full building wall building having heat/electricity producing double walls.

Referring now to FIG. 11, a conceptual view of the present invention when employed in a full building wall is illustrated. A building employing the present invention has a first surface of glass 302 at least on the south facing wall of the building (in the northern hemisphere for example). When the sun's ray impinge on the glass wall 302 heat is produced and captured in the space between the glass wall 302 and glass surface of a second wall 303 that constitutes the wall of the offices floors 304, 306, 308, 310.

Each office floor has vents 314, 316, 318, and 320, which vent to the space between glass wall 302 and office wall 303.

Heat produce between glass wall 302 and office wall 303 rises and is captures in air duct 312. Air duct 312 is in turn connected to a turbine that causes electricity to be produced as described in FIG. 4. Further, because of the flow of warm air between walls 302 and 303, air in the floors is circulated through the floor and vented to the space between the walls 302 and 303. In this manner, there is a constant airflow through the floors cooling them and generating electricity that can be stored in ways known in the art.

It will be appreciated by those skilled in the art that the number of floors in the building is not a limitation. This figure is for illustrative purposes only.

Solar collectors integrated into roof and wall-building components have now been illustrated. As described herein, the integrated solar collectors provide efficient means for collection of solar energy for conversion to heat and electricity and for collection sunlight for building illumination. It will be understood by those skilled in the art of the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A roof truss having a triangular cross section comprising a first side, a second side, and a base, wherein the roof truss comprises:
   a solar energy collector occupying the first side of the roof truss, the solar energy collector comprising:
      a transparent layer, a light-absorbing layer, and an inner layer wherein the transparent layer and the light-absorbing layer define a first channel between them, and the light-absorbing layer and the inside layer define a second channel between them;
      a connection path located near the base of the roof truss connecting the first channel and the second channel;
      a first gap located in the first channel near the apex of the roof truss;
      a truss air duct connected to the first air gap for receiving air that has been heated during its passage through the first channel; and
      a second air gap located in the second channel near the apex of the roof truss for receiving air from a light collector; and
   a light collector occupying the second side of the roof truss, the light collector comprising:
      an outer glazing and inner glazing, wherein the outer glazing and inner define a third channel between them and wherein the third channel is connected to the air gap; and
      an air intake vent located near the base of the roof truss in the inner glazing for receiving air from inside a structure.

2. The roof truss of claim 1 wherein the light-absorbing layer comprises photovoltaic material.

3. A roofing system for a structure, the system comprising:
   a plurality of roof trusses defining the roof of a structure with the first side of each of the plurality of trusses oriented in a southerly direction, wherein each of the plurality of roof trusses has a triangular cross section comprising a first side, a second side, and a base, and wherein a roof truss comprises:
   a solar energy collector occupying the first side of the roof truss, the solar energy collector comprising:
      a transparent layer, a light-absorbing layer, and an inner layer wherein the transparent layer and the light-absorbing layer define a first channel between them, and the light-absorbing layer and the inside layer define a second channel between them;
      a connection path located near the base of the roof truss connecting the first channel and the second channel;
      a first air gap located in the first channel near the apex of the roof truss;
      a truss air duct connected to the first air gap for receiving air that has been heated during its passage through the first channel;
      a second air gap located in the second channel near the apex of the roof truss for receiving air from a light collector; and
      a third air gap for delivering air to a roof air duct; and
   a light collector occupying the second side of the roof truss, the light collector comprising:
      an outer glazing and inner glazing, wherein the outer glazing and inner glazing define a third channel between them and wherein the third channel is connected to the second air gap; and
      an air intake vent located near the base of the roof truss in the inner glazing for receiving air from inside the structure; and
   a roof air duct connected to the third air gap of each of the plurality of roof trusses for receiving air heated by each of the plurality of roof trusses.

4. The system of claim 3 wherein the light-absorbing layer of at least one of the plurality of roof trusses comprises photovoltaic material.

5. The system of claim 3 wherein the system further comprises a means for distributing within the structure the air received by the roof air duct.

6. The system of claim 3 wherein the system further comprises a means for converting the air received by the roof air duct to electricity.

7. The system of claim 3 wherein the system further comprises a means for using the air received by the roof air duct to heat water.

8. A roofing system for a structure, the system comprising:
a plurality of roof panels defining the roof of a structure oriented in a southerly direction, wherein each of the plurality of roof panels has a lower end and an upper end, the roof panel having integrated therein a solar energy collector wherein the solar energy collector comprises:
  a transparent layer, a light-absorbing layer, and an inner layer wherein the transparent layer and the light-absorbing layer define a first channel between them, and the light-absorbing layer and the inside layer define a second channel between them;
  an opening in the second channel proximate to the upper end of the roof panel for receiving air from inside the structure into the second channel;
  a junction located near lower end of the roof panel connecting the first channel and the second channel for receiving air from the second channel;
  a roof cap collector connected to the first channel for receiving air that has been heated during its passage through the first channel; and
  a roof air duct connected to each of the roof cap collectors of the plurality of roof panels for receiving air heated by each of the plurality of roof panels.

9. The system of claim 8 wherein the system further comprises a means for distributing within the structure the air received by the roof air duct.

10. The system of claim 8 wherein the system further comprises a means for converting the air received by the roof air duct to electricity.

11. The system of claim 8 wherein the system further comprises a means for using the air received by the roof air duct to heat water.

12. The system of claim 8 wherein the light-absorbing layer of at least one of the plurality of roof panels comprises photovoltaic material.

13. A wall system for a structure, the system comprising
a plurality of wall panels defining the wall of a structure oriented in a southerly direction, wherein each of the plurality of wall panels has a lower end and an upper end, the wall panel having integrated therein a solar energy collector wherein the solar energy collector comprises:
  a transparent layer, a light-absorbing layer, and an inner layer wherein the transparent layer and the light-absorbing layer define a first channel between them, and the light-absorbing layer and the inside layer define a second channel between them;
  an opening in the second channel proximate to the upper end of the wall panel for receiving air into the second channel;
  a junction located near lower end of the wall panel connecting the first channel and the second channel for receiving air from the second channel;
  a wall collector connected to the first channel for receiving air that has been heated during its passage through the first channel; and
  a roof air duct connected to each of the wall collectors of the plurality of wall panels for receiving air heated by each of the plurality of wall panels.

14. The system of claim 13 wherein the system further comprises a means for distributing within the structure the air received by the roof air duct.

15. The system of claim 13 wherein the system further comprises a means for converting the air received by the roof air duct to electricity.

16. The system of claim 13 wherein the system further comprises a means for using the air received by the roof air duct to heat water.

17. The system of claim 13 wherein the light-absorbing layer of at least one of the plurality of wall panels comprises photovoltaic material.

18. A roof panel having a lower end and an upper end, the roof panel having integrated therein a solar energy collector wherein the solar energy collector comprises:
  a transparent layer, a light-absorbing layer comprising photo-voltaic material, and an inner layer wherein the transparent layer and the light-absorbing layer define a first channel between them and light-absorbing layer and the inside layer define a second channel between them;
  an opening in the second channel proximate to the upper end of the roof panel for receiving air into the second channel;
  a junction located near lower end of the roof panel connecting the first channel and the second channel for receiving air from the second channel; and
  a roof cap collector connected to the first channel proximate to the upper end of the roof panel for receiving air that has been heated during its passage through the first channel.

19. A wall panel having a lower end and an upper end, the wall panel having integrated therein a solar energy collector wherein the solar energy collector comprises:
  a transparent layer, a light-absorbing layer comprising photovoltaic material, and an inner layer wherein the transparent layer and the light-absorbing layer define a first channel between them and light-absorbing layer and the inside layer define a second channel between them;
  an opening in the second channel proximate to the upper end of the wall panel for receiving air into the second channel;
  a junction located near lower end of the wall panel connecting the first channel and the second channel for receiving air from the second channel; and
  a wall collector connected to the first channel proximate to the upper end of the wall panel for receiving air that has been heated during its passage through the first channel.

\* \* \* \* \*